US006243694B1

United States Patent
Bonissone et al.

(10) Patent No.: US 6,243,694 B1
(45) Date of Patent: *Jun. 5, 2001

(54) SYSTEM AND METHOD FOR GENERATING A FUEL-OPTIMAL REFERENCE VELOCITY PROFILE FOR A RAIL-BASED TRANSPORTATION HANDLING CONTROLLER

(75) Inventors: Piero Patrone Bonissone, Schenectady; Yu-To Chen; Pratap Shankar Khedkar, both of Niskayuna; Paul Kenneth Houpt, Schenectady; John Lewis Schneiter, Latham, all of NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,199

(22) Filed: Dec. 29, 1997

(51) Int. Cl.[7] ..................................................... H61F 2/14

(52) U.S. Cl. ................................................................ 706/4

(58) Field of Search ................................... 706/4, 2, 3, 8

(56) References Cited

U.S. PATENT DOCUMENTS

| 5,946,673 | * | 11/1999 | Francone et al. | 706/13 |
| 5,983,144 | * | 11/1999 | Bonissone et al. | 701/19 |
| 5,995,737 | * | 11/1999 | Bonissone et al. | 395/500.29 |
| 6,021,369 | * | 2/2000 | Kamihira et al. | 701/102 |

OTHER PUBLICATIONS

"Genetic Algorithms for Automated Tuning of Fuzzy Controllers: A Transportation Application" by Piero P. Bonissone, et al, Fifth IEEE International Conference on Fuzzy Systems, Sep. 1996, New Orleans, LA, pp. 674–680.

"Automated Fuzzy Knowledge Base Generation and Tuning" by DG Burkhardt, et al, 1992 IEEE, San Diego, CA, pp. 179–188.

"A Classified Review on the Combination Fuzzy Logic–Genetic Algorithms Bibliography" by O. Cordon, et al, Research Report DESCAI95129, Dept. of Computer Science and AI, Universidad de Granada, Granada, Spain, 1995, 21 pages.

"Tuning Fuzzy Logic Controllers by Genetic Algorithms" by F. Herrera, et al, Int. Journal Approximate Reasoning (IJAR), vol. 12, No. 3/4, Apr./May 1995, PP–299–315.

"Fuzzy Control of pH using Genetic Algorithms" by CL Karr, et al, IEEE Transactions on Fuzzy Systems, vol. 1. No. 1, Feb. 1993, pp. 46–53.

(List continued on next page.)

Primary Examiner—Mark R. Powell
Assistant Examiner—Wilbert Starks
(74) Attorney, Agent, or Firm—David C. Goldman; Jill M. Breedlove (57) ABSTRACT

In this invention there is disclosed a system and method for generating a fuel-optimal reference velocity profile for a rail-based transportation handling controller. The fuel-optimal reference velocity profile is used to reduce the amount of fuel consumption. The fuel-optimal reference velocity profile is generated to take into account the speed that a train must travel at in order to satisfy a given schedule, speed constraints that will minimize fuel consumption, and recommended speeds that will prevent train breaks, derailments, cargo damage and violation of safety rules. In this invention, the fuel-optimal reference velocity profile is generated by using a genetic algorithm.

14 Claims, 7 Drawing Sheets

OTHER PUBLICATIONS

"Modifications of Genetic Algorithms for Designing and Optimizing Fuzzy Controllers" by J. Kinzel, et al, 1994 IEEE Conference on Evolutionary Computation, Orlando, FL, vol. 1, pp. 28–33.

"Integrating Design States of Fuzzy Systems Using Genetic Algorithms", by MA Lee, et al, IEEE Conference on Fuzzy Systems, vol. 1, 1993, San Francisco, CA, pp. 612–617.

"Fuzzy Identification of Systems and Its Applications to Modeling and Control" by T.Takagi, et al, IEEE Trans. on Systems, Man and Cybernetics, vol. SMC–15, No. 1, 1985, pp. 116–132.

"A Practical Guide to Tune of Proportional and Integral (PI) Like Fuzzy Controllers" by L. Zeng, 1992 IEEE Conference on Fuzzy Systems, San Diego, CA, pp. 633–640.

"Design of an Adaptive Fuzzy Logic Controller Using a Genetic Algorithm" by CL Karr, In Proc Int. Conf on Genetic Algorithms (ICGA '91), vol. 1, pp. 450–456, San Diego, CA 1991.

* cited by examiner

SYSTEM AND METHOD FOR GENERATING A FUEL-OPTIMAL REFERENCE VELOCITY PROFILE FOR A RAIL-BASED TRANSPORTATION HANDLING CONTROLLER

FIELD OF THE INVENTION

The present invention relates generally to rail-based transportation system handling controllers and more particularly to a system and method for generating a fuel-optimal reference velocity profile for a rail-based transportation system handling controller.

BACKGROUND OF THE INVENTION

Fuel is one of the largest costs associated with operating a rail-based transportation system such as a freight train. A single typical freight locomotive in revenue service with the major railroads may bum over 400,000 gallons of fuel in a year. Many attempts have been made to cut fuel costs, but there is still room for improvement. One approach that has been used to cut fuel costs is to reduce the amount of fuel consumption. It has been determined that a one percent reduction in fuel consumption would result in a $20 million reduction in cost each year. One significant factor which impacts fuel consumption of a train is the variability in operation by different crews. For example, fuel consumption may vary by up to 25% for different crews operating the same train over the same route under similar conditions and load. The variation in fuel consumption is most likely due to inefficient locomotive control. Accordingly, there is a need to improve the control of a locomotive in order to eliminate the variation in fuel consumption.

SUMMARY OF THE INVENTION

This invention is able to eliminate the variability in fuel consumption by generating a fuel-optimal reference velocity profile for a train handling controller that takes into account the operational phases of a train. In particular, the fuel-optimal reference velocity profile takes into account what speed the train must travel at in order to satisfy given schedule and speed constraints while minimizing fuel consumption. In addition, the generated fuel-optimal reference velocity profile takes into account how the train should be controlled, so that the recommended speed can be tracked without causing train breaks, derailments, cargo damage and violation of safety rules.

In accordance with this invention, there is disclosed a system and method for generating an optimized velocity profile in a rail-based transportation handling controller. In this invention, there is a train simulator for simulating an operation of a rail-based transportation system over a specified track profile. In addition, there is a velocity profile generator that generates a velocity profile for operating the rail-based transportation system over the specified track profile. A fuzzy logic controller controls the operation of the train simulator in accordance with the velocity profile provided by the velocity profile generator. In particular, the fuzzy logic controller tracks the error and change in error between the train simulator operation and the velocity profile and provides a control action to the train simulator that minimizes the error. A velocity profile optimizer, coupled to the train simulator and the velocity profile generator, optimizes the generated velocity profile in accordance with the operation of the train simulator.

DETAILED DESCRIPTION OF THE INVENTION

Figure 1:
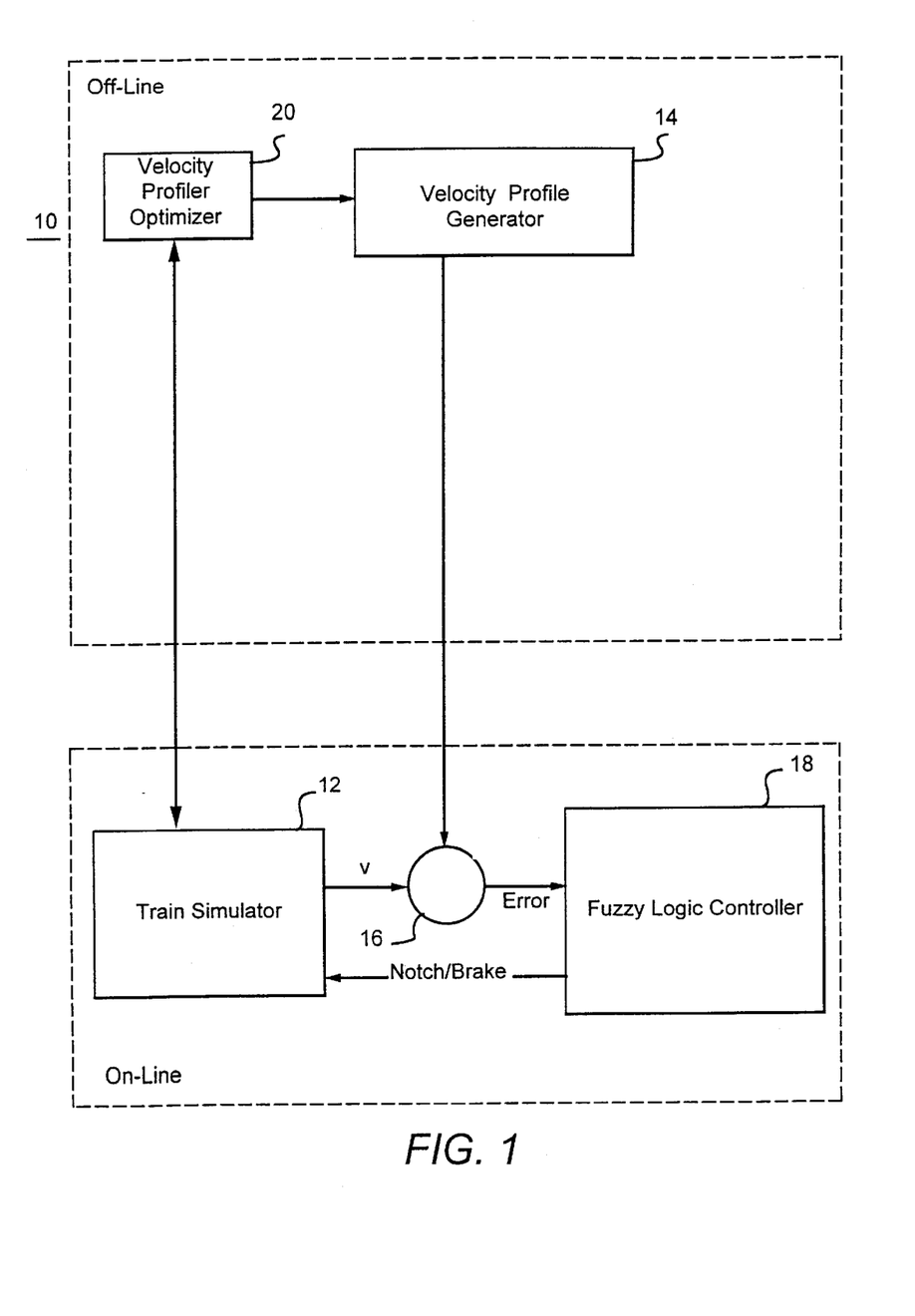
FIG. 1 shows a block diagram of a system for generating an optimized velocity profile in a rail-based transportation handling controller according to this invention.

FIG. 1 shows a block diagram of a system 10 for generating an optimized velocity profile in a rail-based transportation handling controller according to this invention. The system 10 includes a train simulator 12 for simulating the operation of a rail-based transportation system such as a freight train over a specified track profile. A velocity profile generator 14 uses parameters from the train simulator 12 to generate a fuel optimal velocity profile for operating the rail-based transportation system over the specified track profile. A summer 16 compares the speed of the train simulator 12 at various locations of the specified track profile to the generated velocity profile and determines the error therebetween. The summer 16 sends an error signal corresponding to the error between the speed of the train simulator 12 and the velocity profile. A fuzzy logic controller 18 tracks the error and change in error to generate a control action to the train simulator 12 that minimizes the error. In this invention, the control action is the modification of the throttle notch and brake settings. A velocity profile optimizer 20, coupled to the train simulator 12 and the velocity profile generator 14, optimizes the velocity profile in accordance with the operation of the train simulator in order to reduce fuel consumption.

In this invention, the train simulator 12 simulates the operation of the train based on three inputs, the locomotive characteristics, the train makeup and the track profile. The locomotive characteristics specify the tractive/braking effort available at a given velocity and notch setting. The locomotive characteristics also contains a specific fuel consumption table which are specific to each make of locomotive and can be varied suitably. The train makeup is comprised of a list of rail-cars and/or locomotives, arranged in sequential order within the train. The type of the car and the amount of lading has to be specified for each car. The empty weight and other physical characteristics of the rail-car such as cross-sectional area, Davis coefficients etc. are inferred from the car type, and are maintained in a separate database. The track profile comprises a list of mileposts along the specified track, with the distance from the starting point, the current grade in percent, curvature in degrees, and the speed limit in mph. The beginning and end of the journey is marked either by special milepost designations or by a speed limit of zero. The train simulator 12 uses the above-noted inputs to generate performance outputs such as time in minutes, the throttle notch setting having a range from 0–8, the dynamic brake setting having a range from 0–8, the air brake setting in psi, the distance traveled in miles, the velocity in mph, the net acceleration in mph/min, the total cumulative fuel consumed in gallons, the net elevation in miles, the tractive effort in lb-ft, the total braking effort (dynamic+air) in lb-ft, the air brake effort in lb-ft, and the reference velocity in mph. This list of outputs is only illustrative of the possibilities and this invention is not limited thereto.

The outputs generated by the train simulator 12 are then sent to the velocity profile optimizer 20 which uses a genetic algorithm and a fitness function to generate a fuel optimal velocity profile. A genetic algorithm is the name of a technique that is used to find the best solutions to complex multivariable problems. In one sense, a genetic algorithm represents a focused and progressive form of trial and error. Essentially, a genetic algorithm is a computer program that solves search or optimization problems by simulating the process of evolution by natural selection. Regardless of the exact nature of the problem being solved, a typical genetic algorithm cycles through a series of steps. First, a population of potential solutions is generated. Solutions are discrete pieces of data which have the general shape (e.g., the same number of variables) as the answer to the problem being solved. These solutions can be easily handled by a digital computer. Often, the initial solutions are scattered at random throughout the search space.

Next, a problem-specific fitness function is applied to each solution in the population, so that the relative acceptability of the various solutions can be assessed. Next, solutions are selected to be used as parents of the next generation of solutions. Typically, as many parents are chosen as there are members in the initial population. The chance that a solution will be chosen to be a parent is related to the results of the fitness of that solution. Better solutions are more likely to be chosen as parents. Usually, the better solutions are chosen as parents multiple times, so that they will be the parents of multiple new solutions, while the poorer solutions are not chosen at all. The parent solutions are then formed into pairs. The pairs are often formed at random, but in some implementations dissimilar parents are matched is to promote diversity in the children.

Each pair of parent solutions is used to produce two new children. Either a mutation operator is applied to each parent separately to yield one child from each parent, or the two parents are combined using a cross-over operator, producing two children which each have some similarity to both parents. Mutation operators are probabilistic operators that try to introduce needed solution features in populations of solutions that lack such a feature. Cross-over operators are deterministic operators that capture the best features of two parents and pass it on to new off-spring solutions. Cross-over operations generation after generation ultimately combines the building blocks of the optimal solution that have been discovered by successful members of the evolving population into one individual.

The members of the new child population are then evaluated by the fitness function. Since the children are modifications of the better solutions from the preceding population, some of the children may have better ratings than any of the parental solutions. The child population is then combined with the original population that the parents came from to produce a new population. One way of doing this, is to accept the best half of the solutions from the union of the child population and the source population. Thus, the total number of solutions stays the same, but the average rating can be expected to improve if superior children were produced. Note that any inferior children that were produced will be lost at this stage, and that superior children will become the parents of the next generation in the next step. This process continues until a satisfactory solution (i.e., a solution with an acceptable rating according to the fitness function) has been generated. Most often, the genetic algorithm ends when either a predetermined number of iterations has been completed, or when the average evaluation of the population has not improved after a large number of iterations.

Figure 2:
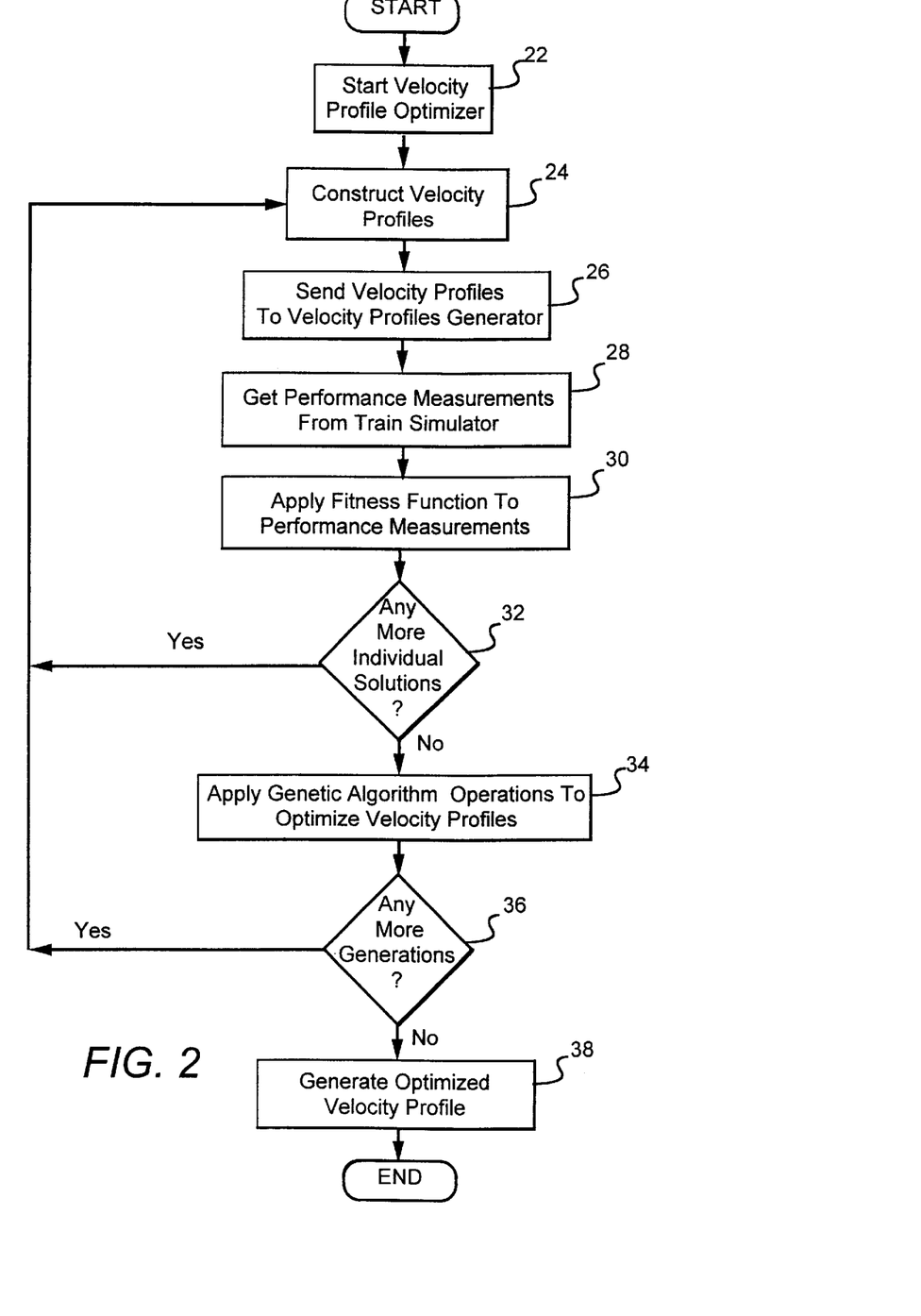
FIG. 2 shows a flow chart setting forth the processing steps performed by the velocity profile optimizer shown in FIG. 1.

FIG. 2 shows a flow chart setting forth the processing steps performed by the velocity profile optimizer 20 shown in FIG. 1. The velocity profile optimizer is started at 22 and then velocity profiles are constructed at 24 for the train simulator for a specified track profile. The velocity profiles are constructed by first segmenting the track profile and encoding the specified track profile as a chromosome. Assuming that the train acceleration remains constant within a $\Delta s$ mile long segment, the projected velocity at any point $\Delta s$ from a current position s is defined as:

$$\hat{v}(s+\Delta s) = \sqrt{v^2(s) + 2 \times a(s) \times \Delta s}, \quad (1)$$

wherein v(s) and a(s) are the current velocity and acceleration of the train at position s, respectively. In this invention, $\Delta s$ is assumed to be one mile long. Thus, a piece-wise velocity profile can be constructed given a constant acceleration for each track segment. Also, it is assumed that the maximum acceleration is ±16 MPH per minute. Thus, five bits are enough to represent the train acceleration for a track segment. This keeps the chromosome for a specified track profile to a manageable size.

After the velocity profiles have been constructed, then the profiles are then sent to the velocity profile generator at 26 and are used to compare with the velocity of the train simulator. The fuzzy logic controller 18 is used to track the error and change in error between the velocity of the train simulator 12 and the velocity profile. Performance measurements are then retrieved at 28 from the train simulator. As mentioned earlier, the performance measurements include outputs such as time, the throttle notch setting, the dynamic brake setting, the air brake setting, the distance traveled, the velocity, the net acceleration, the total cumulative fuel consumed, the net elevation, the tractive effort, the total braking effort, the air brake effort, and the reference velocity.

Next, a fitness function is applied at 30. The fitness function f is formulated as follows:

$$f = \begin{cases} \text{fuel\_used} \times \left(1 + \alpha \times \frac{t-T}{T}\right) & \text{if } t > T \\ \text{fuel\_used} & \text{otherwise} \end{cases} \quad (1)$$

wherein $\alpha$ is a sensitivity parameter. Since the fitness function is measurement of the fuel consumption the goal is to minimize this function. An alternative to the fitness function set forth in equation 2 is to use a multi-objective fitness function. In addition to minimizing fuel consumption the multi-objective fitness function also minimizes throttle jockeying and also takes into account the on-time arrival. The multi-objective function is summarized as:

$$\min\left[\sum_{i=1}^{3} w_i \times \frac{f_i}{k_i}\right], \quad (3)$$

wherein $f_i$ is the objective function, $w_i$ is the weight, and $k_i$ is the normalization factor. The objective function $f_i$ is defined as:

$$f_i = w_1 \frac{f_1}{k_1} + w_2 \frac{f_2}{k_2} + w_3 \frac{f_3}{k_3}, \quad (4)$$

wherein $f_1$ is the total fuel consumed. The throttle jockeying $f_2$ is defined as:

$$f_2 = \sum_i (|\text{notch}_i - \text{notch}_{i-1}| + |\text{dynbrake}_i - \text{dynbrake}_{i-1}|) \quad (5)$$

The time arrival $f_3$ is defined as:

$$f_3 = (T-(t-\Delta t_1))^2, \text{ if } T<(t-\Delta t_1), \quad (6)$$

$$f_3 = (T+(t-\Delta t_2))^2, \text{ if } T>(t-\Delta t_2), \quad (7)$$

$$f_3 = 0, \text{ otherwise} \quad (8)$$

wherein t is the scheduled arrival time, $(t-\Delta t_1)$ and $(t+\Delta t_2)$ is the earliest and latest arrival time that is permissible for the train. Basically, $f_3$ penalizes arriving either too early or too late.

The fitness function f is applied until it has been determined at 32 that there are no more individual solutions (i.e. velocity profiles) left. Next, the genetic algorithm operations are applied at 34 to optimize the velocity profiles. In this invention, the genetic algorithm is an off-the-shelf genetic algorithm known as GENESIS (GENEtic Search Implementation System), which is used to perform a constrained optimization. The constrained optimization takes a multi-criteria objective function and minimizes it subject to system dynamics, boundary conditions, control actions, and path constraints. The objective function is defined as:

$$\min J(u), \quad (9)$$

wherein u is the control action, such as the notch and brake setting. The objective function is subject to system dynamics which are defined as:

$$\dot{x} = f(x, u, t), \quad (10)$$

wherein x is the distance, $\dot{x}$ is the velocity and t is the time. In addition, the objective function is subject to boundary conditions which are defined as:

$$x(O), x(T), \quad (11)$$

wherein x(O) is the start position and x(T) is the final position. The objective function is also subject to the bounded control actions which are defined as:

$$u = [-U_1, U_2], \quad (12)$$

wherein u is the control action. In this invention, the notch setting has a range of [0,8] and the dynamic brake setting has a range of [0,8]. Lastly, the objective function is subject to the path constraints which are defined as:

$$\dot{x} \geq 0, \quad (13)$$

wherein $\dot{x}$ is the velocity. For this constraint, this means that the train only goes forward and cannot go backwards. In this invention, the constraints for optimizing the velocity profile are:

$$v_i = 2.0 \text{ MPH} \quad (14)$$

$$v_f = 0.0 \text{ MPH} \quad (15)$$

$$d \geq D \text{ mile} \quad (16)$$

$$t \leq T \text{ minutes} \quad (17)$$

wherein $v_i$ and $v_f$ are the initial and final velocities of the train, respectively, d is the actual train traveling distance, D is the expected train traveling distance, t is the actual train traveling time and T is the expected train traveling time.

The genetic algorithm operations are applied until it has been determined at 36 that there are no more generations. If there are more genetic algorithm generations, then additional performance measurements are obtained from the train simulator 12. Once the additional performance measurements are obtained, then steps 24–36 are repeated until there are no more generations. Once the genetic algorithms have been applied to all of the generations, then the optimized velocity profile is generated at 38 and ready for use as a reference velocity profile in a train handling controller.

Figure 3:
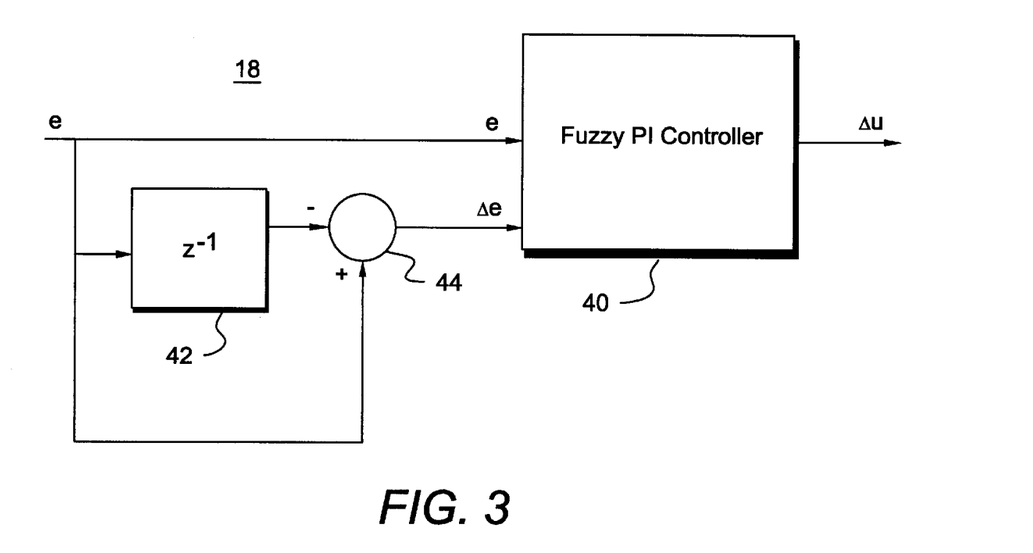
FIG. 3 shows a block diagram of a more detailed view of the fuzzy logic controller shown in FIG. 1.
Figure 4:
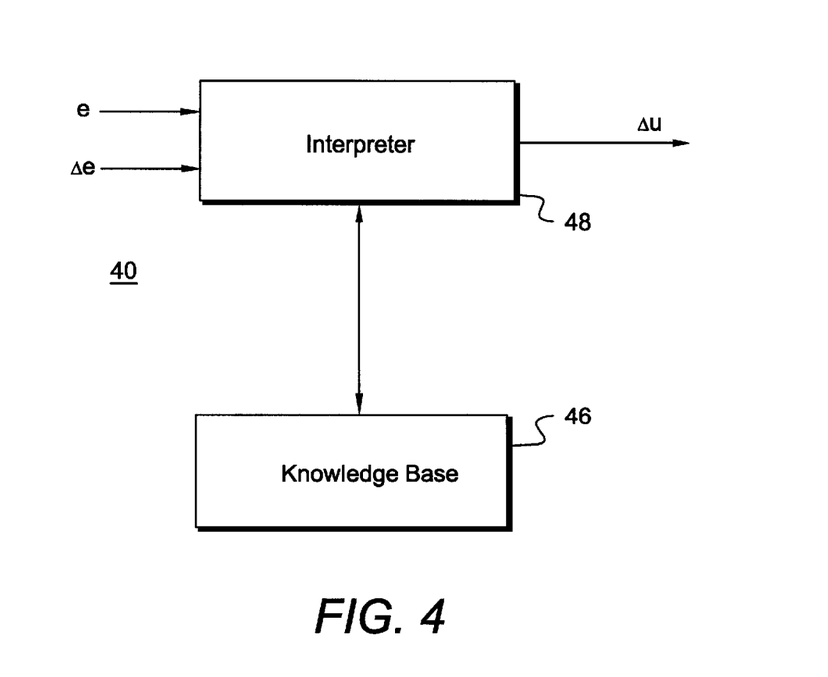
FIG. 4 shows a block diagram of a more detailed view of the fuzzy logic PI controller shown in FIG. 3.

As mentioned above, the fuzzy logic controller 18 tracks the error and change in error to generate a control action to the train simulator 12 that minimizes the error. FIG. 3 shows a block diagram of a more detailed view of the fuzzy logic controller 18. The fuzzy logic controller 18 comprises a fuzzy logic PI controller 40 that receives the error e determined by the summer 16 and change in error $\Delta e$ as determined by a delay element (i.e., a sample and hold) 42 and a summer 44 to generate incremental control actions $\Delta u$. The fuzzy logic PI controller as shown in FIG. 4 comprises a knowledge base 46 having a rule set, term sets, and scaling factors. The rule set maps linguistic descriptions of state vectors such as e and $\Delta e$ into the incremental control actions $\Delta u$; the term sets define the semantics of the linguistic values used in the rule sets; and the scaling factors determine the extremes of the numerical range of values for both the input (i.e., e and $\Delta e$) and the output (i.e., $\Delta u$) variables. An interpreter 48 is used to relate the error e and the change in error $\Delta e$ to the control action $\Delta u$ according to the scaling factors, term sets, and rule sets in the knowledge base 46.

Figure 5:
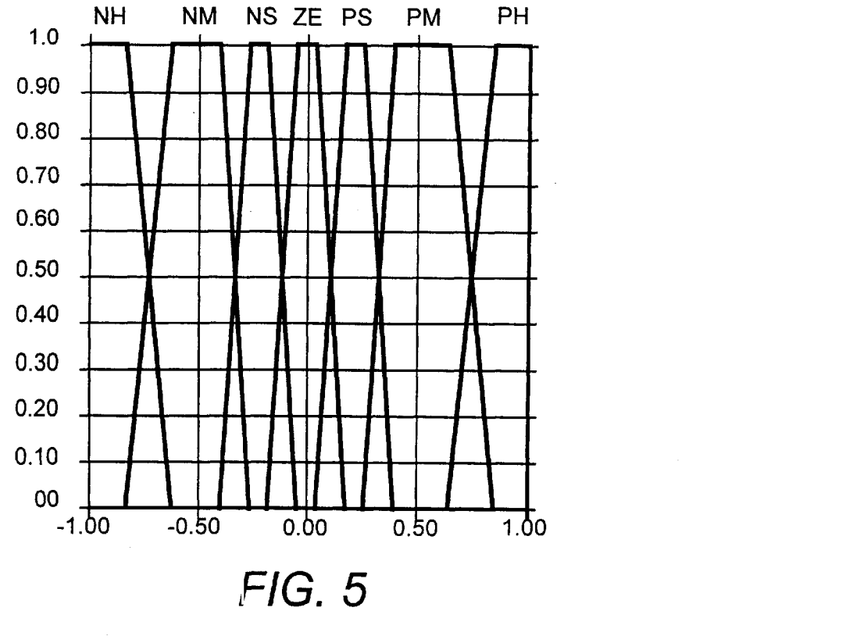
FIG. 5 shows an example of a fuzzy membership function used in this invention.

In this invention, each of the input variables (e and $\Delta e$) and the output variable ($\Delta u$) have a term set. The term sets are separated into sets of NH, NM, NL, ZE, PL, PM, PH, wherein N is negative, P is positive, H is high, M is medium, L is low, and ZE is zero. Accordingly, NH is negative high, NM is negative medium, NL is negative low, PL is positive low, PM is positive medium, and PH is positive high. Those skilled in the art will realize that there are other term sets that can be implemented with this invention. Each term set has a corresponding membership function that returns the degree of membership or belief, for a given value of the variable. Membership functions may be of any form, as long as the value that is returned is in the range of [0,1]. Initially, the terms are uniformly positioned trapezoids overlapping at a 50% level over the normalized universe of discourse as shown in FIG. 5.

Figure 6:
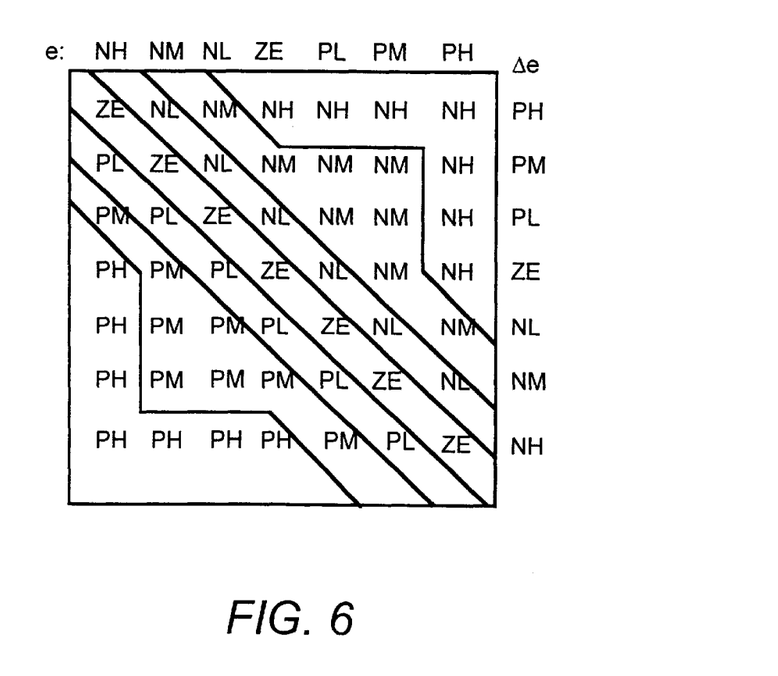
FIG. 6 shows an example of a rule set for the fuzzy logic PI controller.

An example of a rule set for the fuzzy logic PI controller 40 is shown in FIG. 6. As mentioned above, the rule set maps linguistic descriptions of the error e and the change in error $\Delta e$ into the control action $\Delta u$. In FIG. 6, if e is NH and $\Delta e$ is PH, then $\Delta u$ will be ZE. Another example is if e is PL and $\Delta e$ is NH, then $\Delta u$ will be PM. Those skilled in the art will realize that there are other rule sets that can be implemented with this invention.

The relationship between the output variable u and the input variable e in the fuzzy logic PI controller 40 is expressed approximately as:

$$\frac{\Delta u(t)}{S_u} \approx \frac{\Delta e(t)}{S_d} + \frac{e(t)}{S_e}, \quad (18)$$

$$u(t) \approx \frac{S_u}{S_d} \cdot e(t) + \frac{S_u}{S_e} \cdot \int e(t), \quad (19)$$

$$-S_e \leq e(t) \leq S_e, \quad (20)$$

$$-S_d \leq \Delta e(t) \leq S_d, \quad (21)$$

$$-S_u \leq \Delta u(t) \leq S, \quad (22)$$

wherein $S_e$, $S_d$, $S_u$, are the scaling factors of the error e, the change of error $\Delta e$, and the incremental output variable $\Delta u$, respectively. The above relationship differs from a conventional PI controller which is defined as:

$$u(t) = K_p e(t) + K_i \int e(t) dt, \quad (23)$$

wherein $K_p$ and $K_i$ are the proportional and integral gain factors, respectively. Comparing the fuzzy logic PI controller of this invention with the conventional PI controller results in the following:

$$K_p \approx \frac{S_u}{S_d} \text{ and } K_i \approx \frac{S_u}{S_e} \cdot \left(\frac{1}{dt}\right) \quad (24)$$

Figure 7:
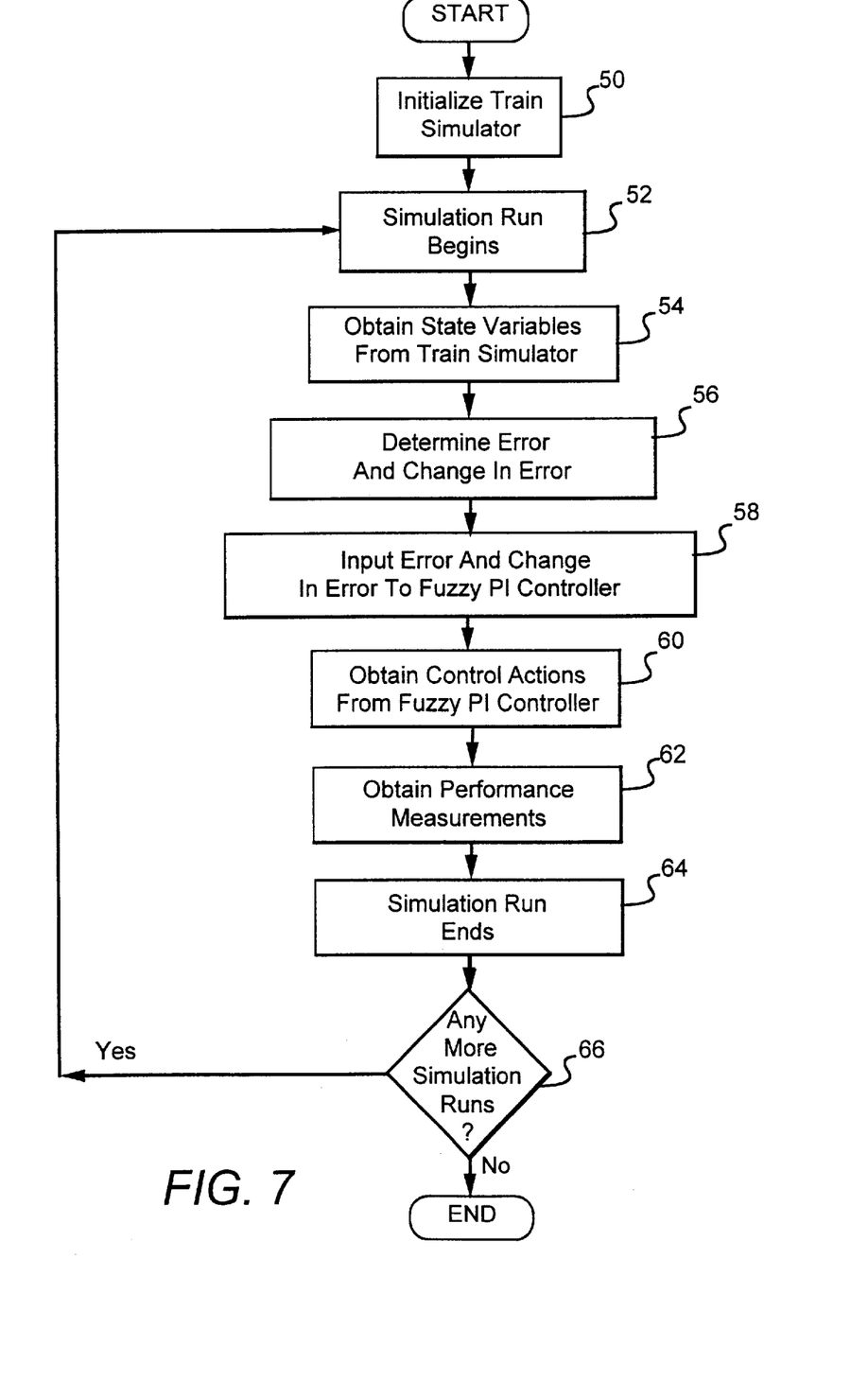
FIG. 7 shows a flow chart setting forth the processing steps in obtaining performance measurements with the fuzzy logic PI controller.

FIG. 7 shows how the performance measurements are obtained by using the fuzzy logic PI controller 40. Referring now to FIG. 7, the train simulator 12 is initialized for a journey over a specified track profile at 50. Next, a simulation run is begun at 52. At each simulator run, state variables are obtained from the train simulator at 54. In this invention, the state variables are the speed of the train simulator and the position of the simulator with respect to the specified track profile. The state variables are then used to determine the error and change in error at 56. The error and change in error values are then inputted to the fuzzy logic PI controller at 58. The fuzzy logic PI controller uses the inputted state variables to recommend a control action (i.e., a change in the throttle notch and braking settings) at 60. The performance of the train simulator 12 such as the fuel usage, the tracking of the error, and throttle notch jockeying are then obtained at 62 and stored in a log. The simulation run then ends at 64. If it is determined that there are more simulation runs left in the journey at 66, then processing steps 52–66 are continued until there are no longer any more simulation runs.

Figure 8A:
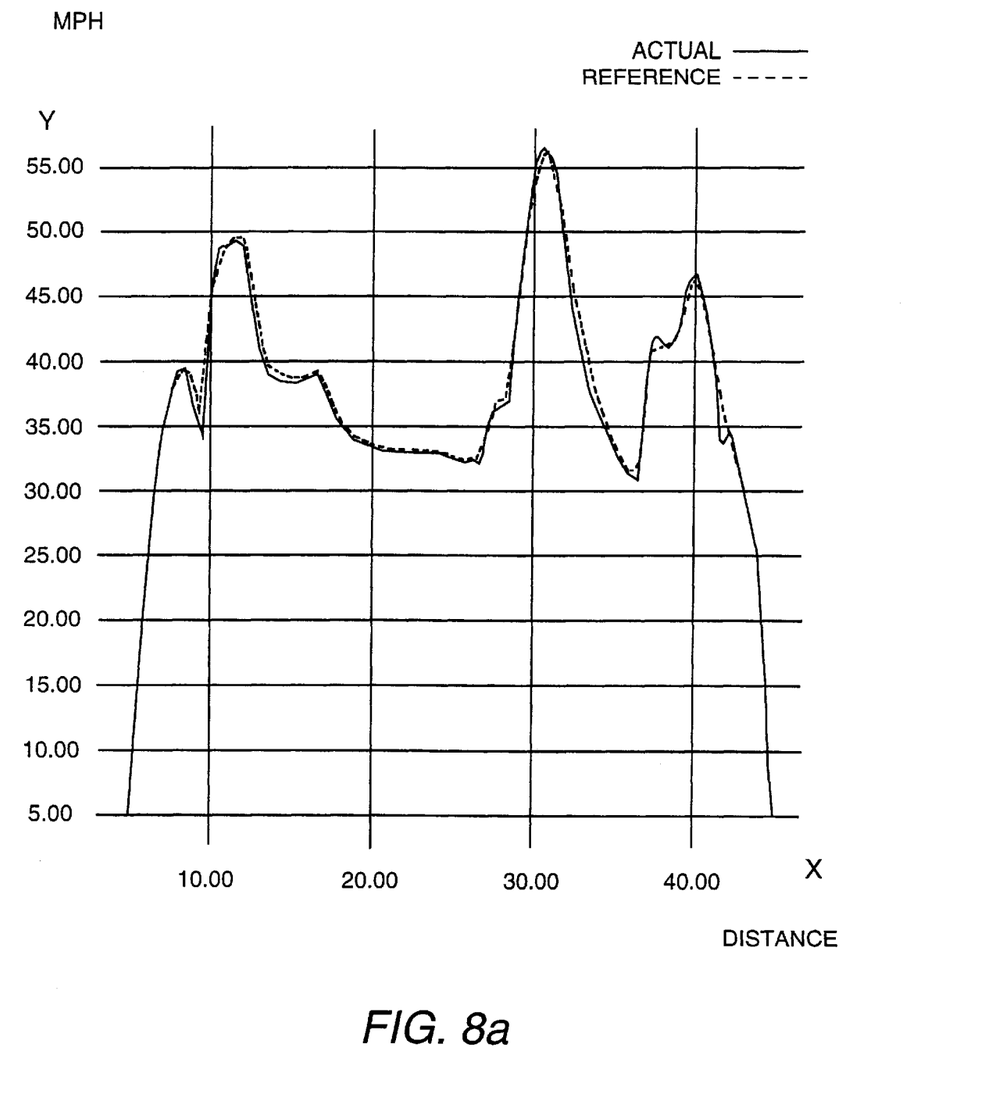
FIGS. 8a–8b show the performance of a rail-based transportation handling controller using a velocity profile generated according to this invention.
Figure 8B:
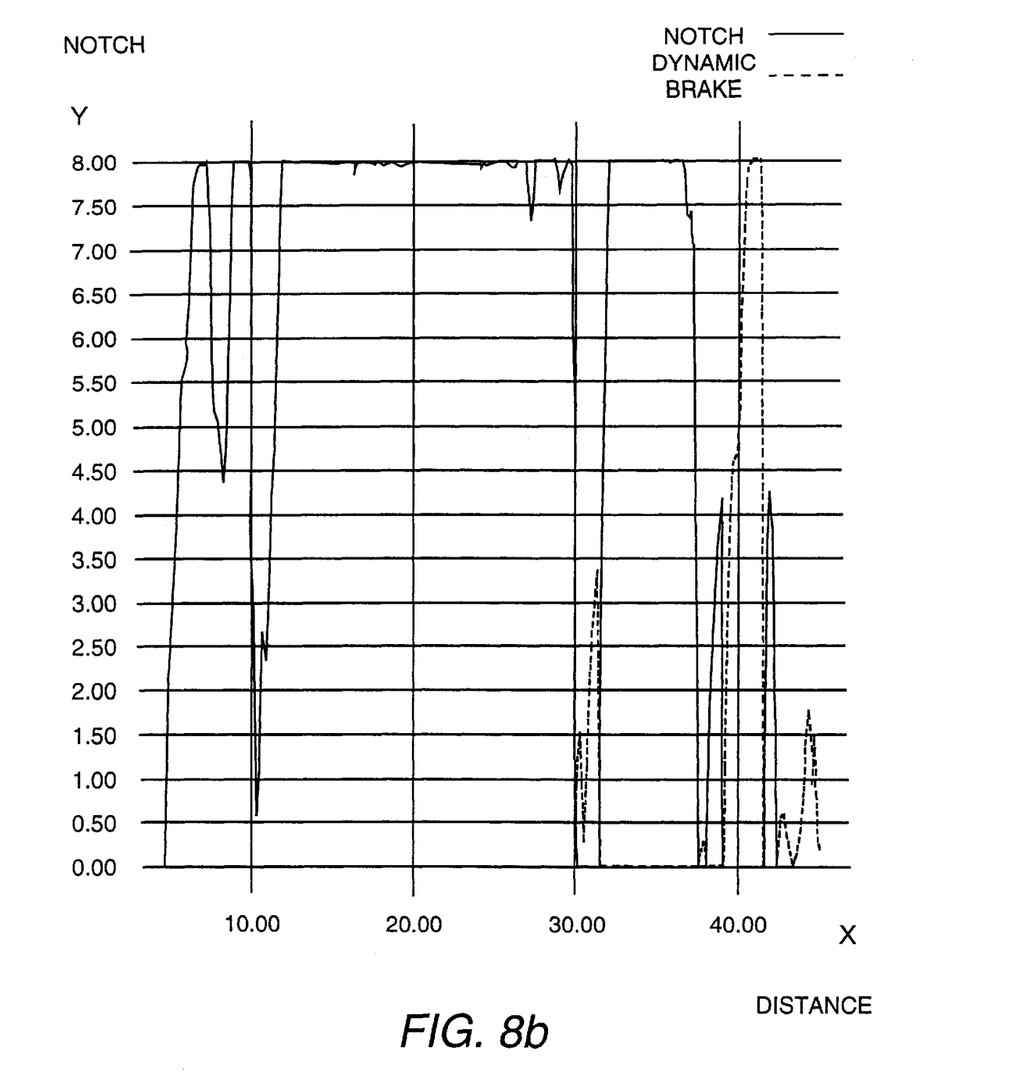

The velocity profile generated with this invention results in a significant reduction in fuel consumption. FIGS. 8a–8b show the performance of a rail-based transportation handling controller using a fuel-optimal velocity profile generated with this invention. In particular, FIG. 8a shows the velocity of the train simulator using an optimized velocity profile and FIG. 8b shows the control actions for the throttle notch and brake settings generated from the fuzzy logic PI controller using an optimized velocity profile.

It is therefore apparent that there has been provided in accordance with the present invention, system and method for generating a fuel-optimal reference velocity profile for a rail-based transportation handling controller that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

What is claimed is:

1. A system for generating an optimized velocity profile in a rail-based transportation handling controller, comprising:
   a train simulator for simulating an operation of a rail-based transportation system over a specified track profile;
   a velocity profile generator for generating a velocity profile for operating the rail-based transportation system over the specified track profile;
   a fuzzy logic controller for controlling the operation of the train simulator in accordance with the velocity profile provided by the velocity profile generator, the fuzzy logic controller tracking error and change in error between the train simulator operation and the velocity profile and providing a control action to the train simulator that minimizes the error; and
   a velocity profile optimizer, coupled to the train simulator and the velocity profile generator, for optimizing the generated velocity profile in accordance with the operation of the train simulator, wherein the velocity profile optimizer comprises at least one fitness function.

2. The system according to claim 1, wherein the velocity profile optimizer further comprises a genetic algorithm for optimizing the velocity profile according to the evaluations determined by the fitness function.

3. The system according to claim 1, wherein the fuzzy logic controller comprises a fuzzy logic knowledge base comprising scaling factors, membership functions, and rule sets defined for the error, the change in error, and the control action.

4. The system according to claim 3, wherein the fuzzy logic controller further comprises an interpreter for relating the error and the change in error to the control action according to the scaling factors, membership functions, and rule sets in the fuzzy logic knowledge base.

5. The system according to claim 4, wherein the control action is used to modify throttle notch and brake settings for the train simulator.

6. The system according to claim 5, wherein the fuzzy logic controller is a fuzzy logic proportional integral controller.

7. A method for generating an optimized velocity profile in a rail-based transportation handling controller, comprising the steps of:
   simulating an operation of a rail-based transportation system over a specified track profile;
   providing a velocity profile for operating the rail-based transportation system over the specified track profile;
   providing a fuzzy logic controller for controlling the simulated operation in accordance with the velocity profile, the fuzzy logic controller tracking error and change in error between the simulated operation and the velocity profile and providing a control action to the simulated operation that minimizes the error; and
   optimizing the velocity profile in accordance with the simulated operation, wherein the optimizing comprises using at least one fitness function.

8. The method according to claim 7, wherein the step of optimizing further comprises using a genetic algorithm for optimizing the velocity profile according to the evaluations determined by the fitness function.

9. The method according to claim 7, wherein the step of providing the fuzzy logic controller comprises providing a fuzzy logic knowledge base comprising scaling factors, membership functions, and rule sets defined for the error, the change in error, and the control action.

10. The method according to claim 9, wherein the step of providing the fuzzy logic controller further comprises providing an interpreter for relating the error and the change in error to the control action according to the scaling factors, membership functions, and rule sets in the fuzzy logic knowledge base.

11. The method according to claim 10, further comprising the step of using the control action to modify throttle notch and brake settings for the simulated operation.

12. The method according to claim 11, wherein the step of providing a fuzzy logic controller comprises providing a fuzzy logic proportional integral controller.

13. A system for generating a fuel optimized velocity profile for a rail-based transportation handling controller, comprising:

a train simulator that simulate s an operation of a rail-based transportation system over a specified track profile;

a velocity profile generator that generates a velocity profile for operating the rail-based transportation system over the specified track profile;

a fuzzy logic controller that controls the operation of the train simulator in accordance with the velocity profile provided by the velocity profile generator, the fuzzy logic controller tracking error and change in error between the train simulator operation and the velocity profile and providing a control action to the train simulator that minimizes the error; and a velocity profile optimizer, coupled to the train simulator and the velocity profile generator, that optimizes the generated velocity profile in accordance with the operation of the train simulator and reduces fuel consumption, wherein the velocity profile optimizer comprises at least one fitness function.

14. A method for generating a fuel optimized velocity profile for a rail-based transportation handling controller, comprising the steps of:

simulating an operation of a rail-based transportation system over a specified track profile;

providing a velocity profile for operating the rail-based transportation system over the specified track profile;

providing a fuzzy logic controller for controlling the simulated operation in accordance with the velocity profile, the fuzzy logic controller tracking error and change in error between the simulated operation and the velocity profile and providing a control action to the simulated operation that minimizes the error; and optimizing the velocity profile in accordance with the simulated operation to reduce fuel consumption, wherein the optimizing comprises using at least one fitness function.

* * * * *